UNITED STATES PATENT OFFICE.

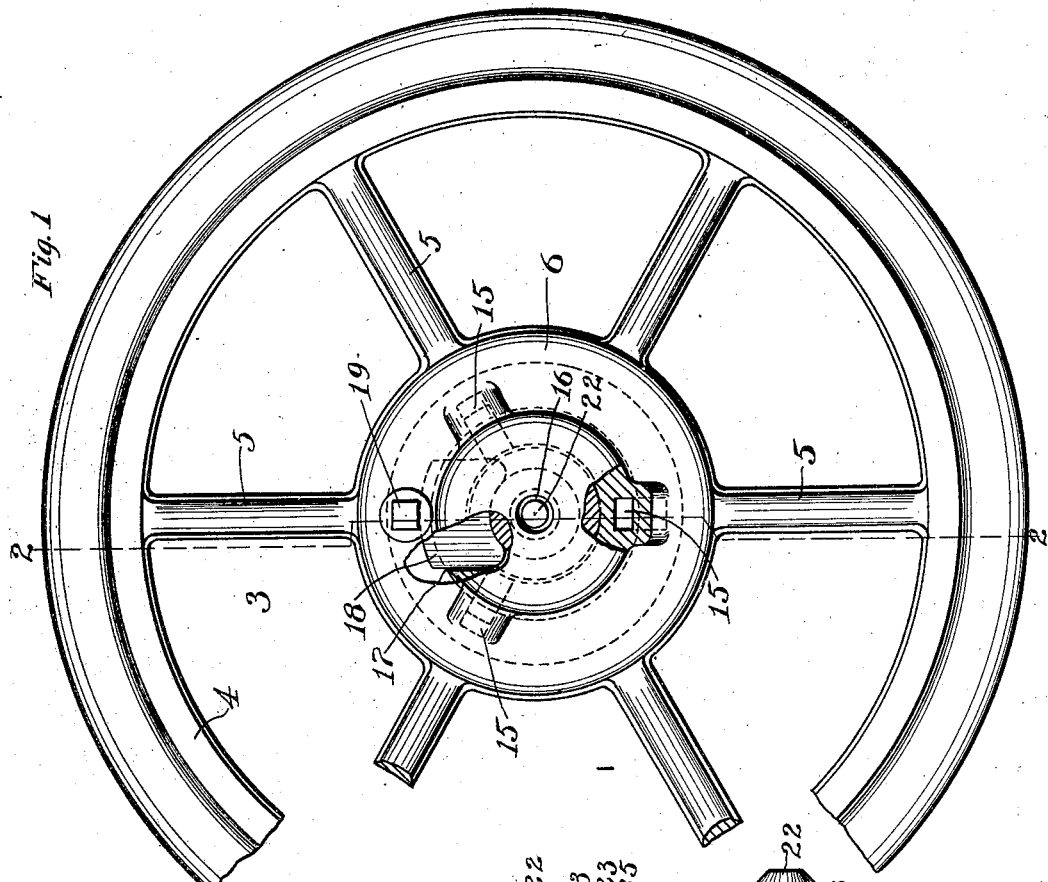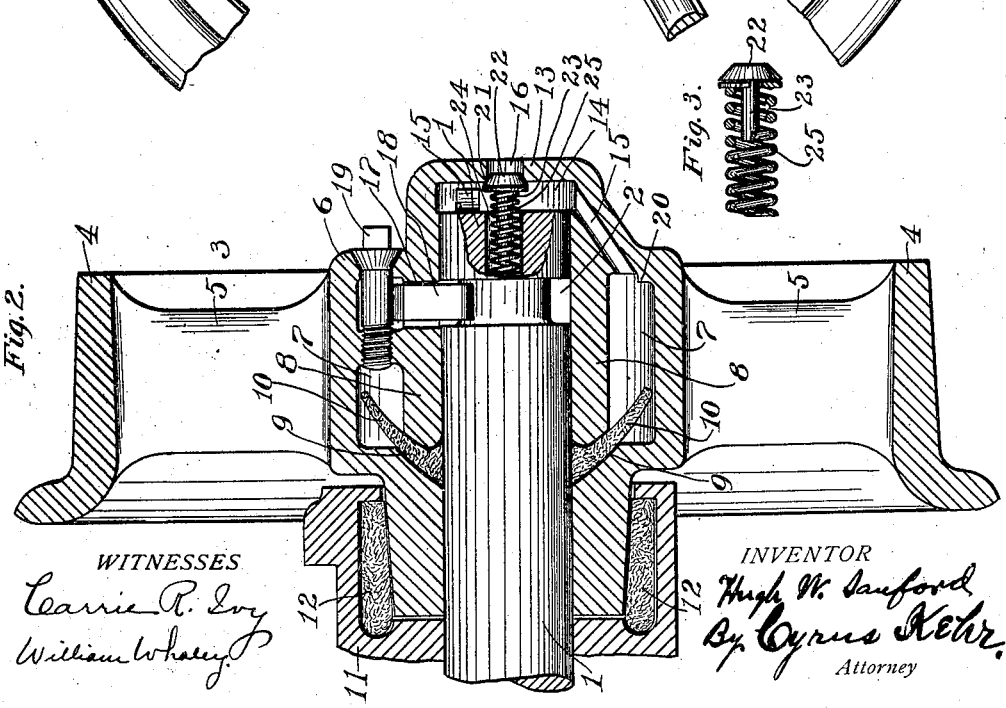

HUGH W. SANFORD, OF KNOXVILLE, TENNESSEE.

AXLE-LUBRICATING MECHANISM.

No. 847,263.  Specification of Letters Patent.  Patented March 12, 1907.

Application filed January 3, 1907. Serial No. 350,645.

*To all whom it may concern:*

Be it known that I, HUGH W. SANFORD, a citizen of the United States, residing at Knoxville, in the county of Knox and State of Tennessee, have invented a new and useful Improvement in Axle-Lubricating Mechanism, of which the following is a specification, reference being had to the accompanying drawing.

My improvement relates generally to axle-lubricating mechanism, and is particularly applicable to vehicles in which the wheels rotate on the axles. Mine-cars are usually of this type, and the application of the improvement to a wheel and axle of such a car is hereinafter described.

The object of the invention is to produce a car-wheel which may be easily and cheaply manufactured and which will contain efficient and convenient means for the lubrication of the portion of the axle which extends into the hub surrounding the axle.

In the accompanying drawings, Figure 1 is an elevation of the outer or front side of a wheel embodying my improvement, portions of said wheel being broken away. Fig. 2 is a section on the line 2 2 of Fig. 1. Fig. 3 is a sectional detail of the valve and spring used for closing the port through which oil is introduced into the hub.

For convenience in description, the side or portion of the wheel directed away from the car will be herein designated the "front" side or portion, while the opposite side or portion will be termed the "rear" side or portion.

Referring to said drawings, 1 is one end of a car-axle which is secured non-rotatably to a car. An annular groove 2 is formed into the axle, near the end of the latter, to receive a key-block, as will be hereinafter described. The wheel 3 has a rim 4, spokes 5, and a hub 6. Between its ends the hub is thickened and has in said thickened portion a relatively large annular oil chamber or reservoir 7, approximately concentric with the hub-axis, such reservoir being separated from the axle 1 by means of a wall 8. From points adjacent said reservoir and distributed approximately equidistant from each other around the axle ducts 9 extend from the bore of the hub into said reservoir. Said reservoir is preferably broadened in a direction parallel to the axle 1 and said ducts 9 made to enter the rear portion of said reservoir. At its rear said hub is extended a suitable distance to enter a packing-box 11, containing packing 12 for preventing the passage of oil or dust. At its opposite end the hub extends continuously over or across the adjacent end of the axle, forming a wall 13, standing at a short distance away from said end of said axle and leaving a passage 14. From said passage a plurality of relatively small ducts 15 extend obliquely and radially outward away from the axial line of the hub into the front portion of the oil-reservoir 7, said ducts being approximately equally distributed around the hub-axis. On the axial line of the hub a port 16 extends through said wall 13, said port being of proper size to receive the nozzle or discharge end of an oil-can for introducing oil into the passage 14, said space being preferably only sufficient to permit the downward flow of the oil issuing from the nozzle or discharge end of an oil-can inserted into said port. The drawings show three such ducts 15 distributed equidistant around the hub-axis, so that at least one of said ducts is always located below the level of the port 16 in position to permit the oil to flow by gravity downward from the port 16 through said duct 15 into the lower front portion of the oil chamber or reservoir 7. The various portions of said hub constitute a one-piece casting.

Opposite the groove 2 the hub has a recess 17 large enough to receive all of a key-block 18, which is adapted to extend into the annular groove 2. A screw bolt or plug 19 extends through the wall of the hub at each side of said chamber parallel to the hub-axis and through said chamber between said key-block and the outer wall of the hub and holds said key-block in said groove 2. When the wheel is to be detached, said screw-bolt is removed and the key-block 18 allowed to fall completely into the recess 17 when the wheel has been so turned as to bring said recess beneath the axle. Then the wheel is free for removal.

In operation oil is introduced through the port 16 by inserting the nozzle or spout of an oil-can into said port, and the oil immediately flows downward through the lower portion of the passage 14 and the end of the axle and through the oblique duct or ducts 15 at the time below said port into the lower forward portion of the annular reservoir 7, as already described. Said reservoir is large enough to contain a sufficient quantity of oil to lubricate said axle a relatively long time. A piece of absorbent material 10 rests in each passage 9 and extends into the annular reservoir. When one of the passages 9 is beneath the axle, its piece of absorbent material extends into the oil and by capillary attraction carries oil to the axle. Furthermore, with the rotation of the hub oil is carried upward on the faces of the reservoir and a portion thereof made to flow upon the pieces of absorbent material 10 and into the passages or ducts 9 when the latter are above the axle. To hinder the oil from flowing into the ducts 15 when the latter are above the axle, each duct is made to enter the reservoir 7 at a little distance away from the curved walls of said reservoir, and the portion or lip 20 of the upright wall between said outer curved wall and the adjacent end of the duct 15 is placed rearward of the portion of said upright wall between the end of said duct and the axle, so that oil dripping from said lip 20 will pass the entrance to the duct 15 and fall upon the inner curved face of the reservoir 7. The port 16, the passage 14, and the ducts 15 may be regarded as a spider-form group of ducts leading from the front exterior of the hub to the reservoir 7 for conducting oil into said reservoir. The inner portion of the port 14 is treated as a valve-seat 21 for an inward-yielding valve 22, having a stem 23. Said stem extends into a socket 24, formed into the end of the axle on the axial line of the latter, and said stem is surrounded by an expanding coiled spring 25, bearing by one end against the interior or bottom of said socket and by its other end against said valve, so that the latter is normally pressed against said valve-seat and the port 16 thereby closed. By pressing the nozzle of an oil-can inward through said port against said valve the latter may be pressed inward, said spring being compressed until said nozzle can discharge its oil in the circular passage 14, the oil flowing thence through the duct or ducts 15 at the time below the level of said port.

It will be observed that inasmuch as the port 16 and the socket 24 are axially in line with the axle 1 the wheel may rotate and by frictional engagement rotate said valve, the latter and its stem turning independently of the spring or the spring also turning with said valve and stem. If so desired, the said spring and stem may be secured non-rotatably in said socket, so that said valve-seat will rotate around said valve. It will be observed that the valve, the valve-stem, and the spring may be readily removed and replaced. It will also be observed that the axle forms an abutment for the spring 25.

I claim as my invention—

1. In a structure of the nature described, an axle, a wheel having a hub extending around and over the end of said axle and having a port in the axial line of said axle, a valve extending over said port within said hub, and a spring bearing against said valve and having said axle for an abutment, substantially as described.

2. In a structure of the nature described, an axle having a socket in its end, a wheel having a hub extending around and over the end of said axle and having a port in the axial line of said axle, a valve extending over said port within said hub, and a spring bearing against said valve and extending into said socket, substantially as described.

3. In a structure of the nature described, an axle, a wheel having a hub extending around and over the end of said axle and having a port in the axial line of said axle, a valve extending over said port within said hub and having a stem, and a spring surrounding said stem and bearing against said valve and having said axle for an abutment, substantially as described.

4. In a structure of the nature described, an axle having a socket in its end, a wheel having a hub extending around and over the end of said axle and having a port in the axial line of said axle, a valve extending over said port within said hub and having a stem, and a spring surrounding said stem and bearing against said valve and the interior of said socket, substantially as described.

In testimony whereof I have signed my name, in presence of two witnesses, this 29th day of December, in the year 1906.

HUGH W. SANFORD.

Witnesses:
 CYRUS KEHR,
 C. A. MORSE.